United States Patent
Thir

(10) Patent No.: US 6,554,309 B2
(45) Date of Patent: Apr. 29, 2003

(54) BICYCLE PEDALING POWER UNIT WITH LEVERAGE SHIFTING

(76) Inventor: Peter Thir, P.O. Box 1036, La Plata, MD (US) 20646

( * ) Notice: Subject to any disclaimer, the term of this patent is extended or adjusted under 35 U.S.C. 154(b) by 0 days.

(21) Appl. No.: 09/931,854

(22) Filed: Aug. 20, 2001

(65) Prior Publication Data

US 2002/0036389 A1 Mar. 28, 2002

Related U.S. Application Data

(63) Continuation-in-part of application No. 09/667,609, filed on Sep. 22, 2000, now abandoned.

(51) Int. Cl.$^7$ ................................................ B62M 5/00
(52) U.S. Cl. ...................... 280/253; 280/236; 280/252; 280/242.1; 74/512
(58) Field of Search ................................ 280/236, 238, 280/251, 252, 253, 254, 255, 257, 267, 258, 288.1, 242.1, 7; 24/512, 594.1, 594.3

(56) References Cited

U.S. PATENT DOCUMENTS

| | | | | |
|---|---|---|---|---|
| 314,236 A | * | 3/1885 | Gormley | 74/137 |
| 3,760,905 A | * | 9/1973 | Dower | 185/2 |
| 3,913,945 A | | 10/1975 | Clark | |
| 3,920,263 A | | 11/1975 | Bundschuh | |
| 4,052,912 A | | 10/1977 | Vukelic | |
| 4,227,712 A | * | 10/1980 | Dick | 280/236 |
| 4,437,677 A | | 3/1984 | Ksayian | |
| 4,533,152 A | | 8/1985 | Clark | |
| 4,574,649 A | * | 3/1986 | Seol | 74/138 |
| 4,639,007 A | * | 1/1987 | Lawrence | 280/234 |
| 4,811,964 A | | 3/1989 | Horn | |
| 5,272,928 A | | 12/1993 | Young | |
| 5,584,732 A | * | 12/1996 | Owen | 440/13 |
| 5,653,663 A | | 8/1997 | McCahon | |
| 5,690,346 A | | 11/1997 | Keskitalo | |
| 5,785,337 A | * | 7/1998 | Ming | 280/255 |
| 5,833,256 A | | 11/1998 | Gilmore | |
| 5,979,922 A | | 11/1999 | Becker et al. | |
| 6,000,707 A | | 12/1999 | Miller | |
| 6,173,981 B1 | | 1/2001 | Coleman | |
| 6,371,891 B1 | * | 4/2002 | Speas | 482/57 |

FOREIGN PATENT DOCUMENTS

| | | | |
|---|---|---|---|
| DE | 3149184 A | * | 9/1983 |
| DE | 2980643 U1 | | 6/1998 |
| DE | 19901478 B1 | | 7/2000 |
| SU | 1326494 A | * | 7/1987 |

* cited by examiner

*Primary Examiner*—Lesley D. Morris
*Assistant Examiner*—Daniel Yeagley
(74) *Attorney, Agent, or Firm*—Dickstein Shapiro Morin & Oshinsky LLP

(57) ABSTRACT

A system for powering vehicles such as bicycles using leverage type pedals each connected to a freewheeling sprocket and then connected to a common drive shaft in the rear of the vehicle. A keyed shaft connects all free wheeling sprockets and provides for each sprocket to drive the keyed shaft in one rotational direction. A hand powering unit operates through a separate free wheeling sprocket and is also arranged like a lever in similar manner to the pedals. Lowered seating for horizontal movement of legs is preferred arrangement.

23 Claims, 10 Drawing Sheets

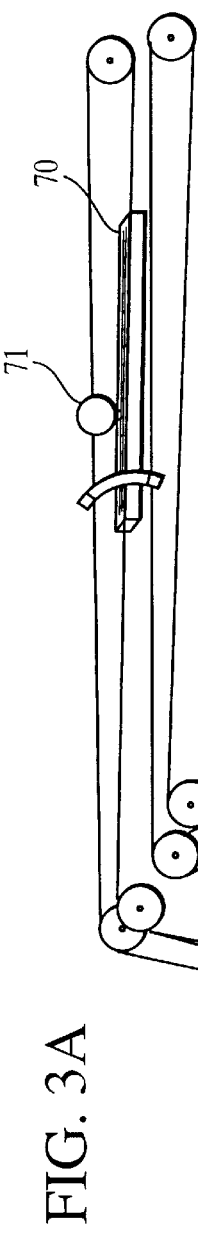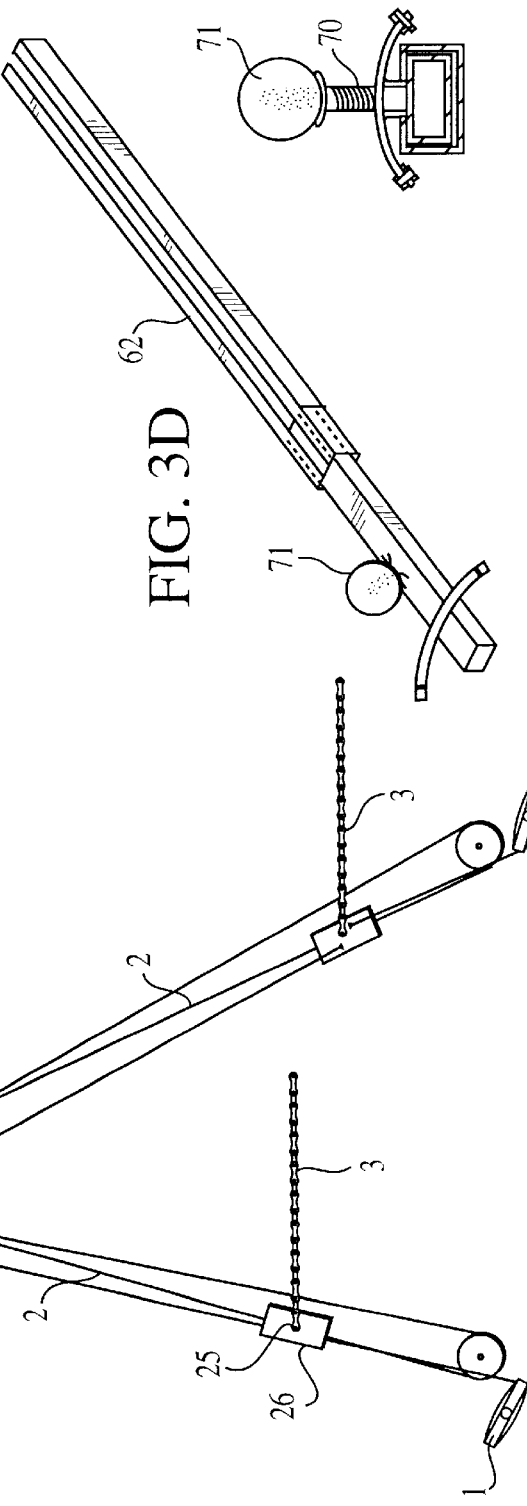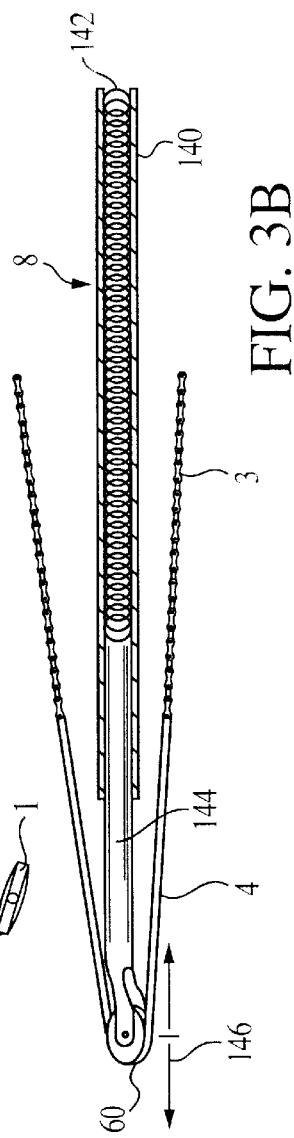

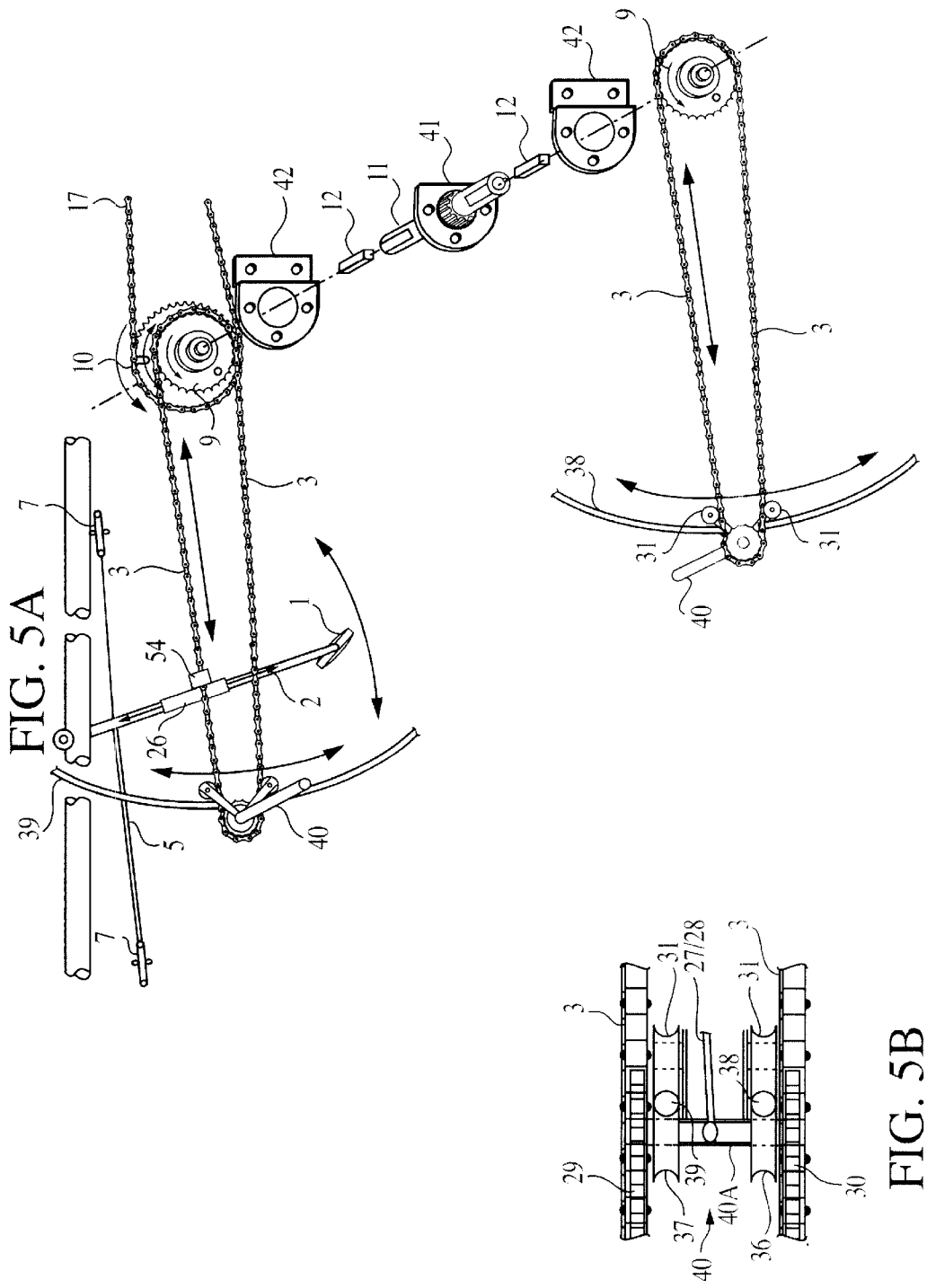

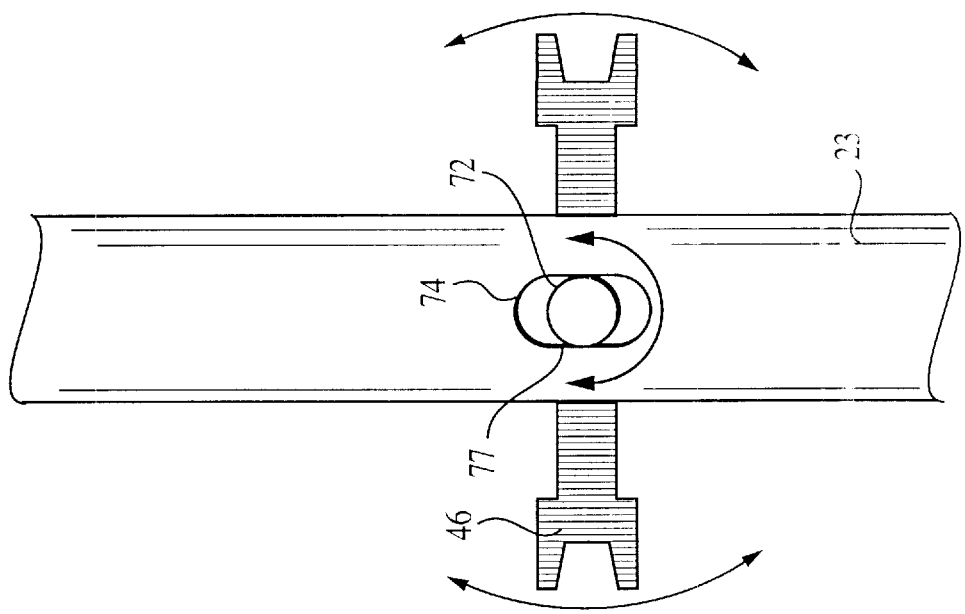
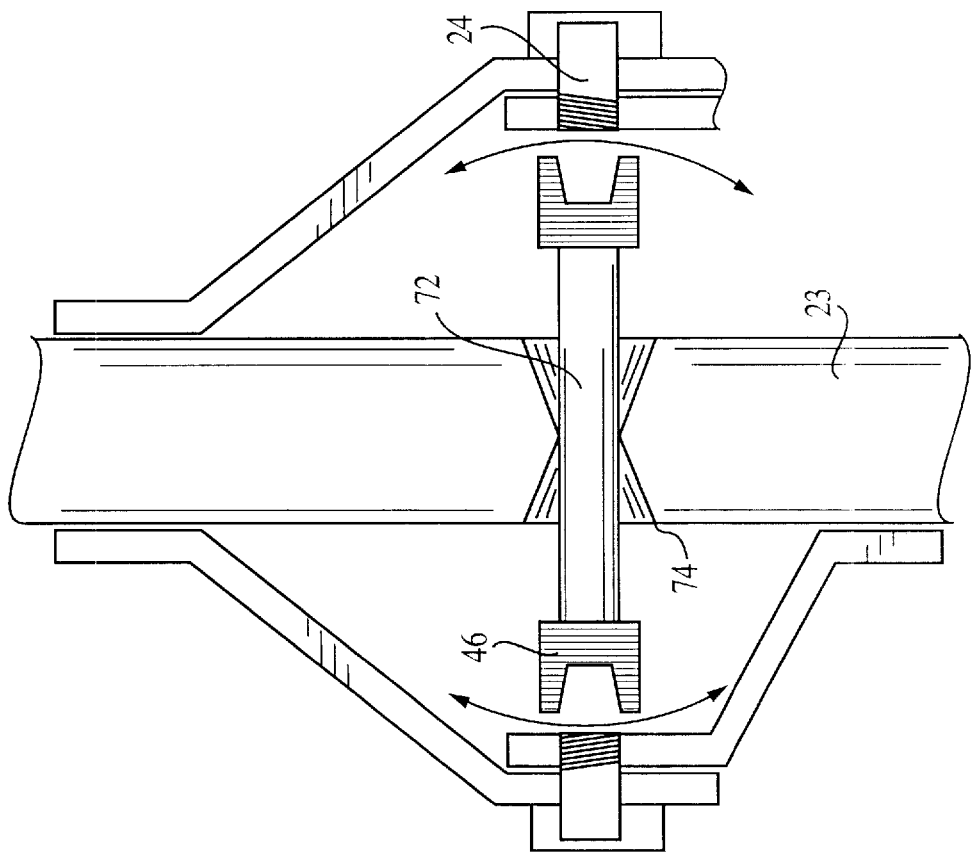
FIG. 7A
FIG. 7B

BICYCLE PEDALING POWER UNIT WITH LEVERAGE SHIFTING

CROSS-REFERENCE TO RELATED APPLICATIONS

This application is a Continuation-in-Part Application of U.S. patent application Ser. No. 09/667,609 filed on Sep. 22, 2000 (now abandoned), the entirety of which is incorporated herein by reference.

FIELD OF THE INVENTION

The invention relates to the field of bicycles and in particular to a pedal powered unit with separate drive chains for each of the pedals to allow for continuous shifting as well as a more horizontal position for the user's legs. The invention can also be used in tricycles with only minor modifications.

The invention also describes new and improved methods for shifting for power and speed as well as a hand pedaling arrangement to allow for supplemental power to be supplied by the arms of the driver. The invention also provides for a lowered seating arrangement that allows the maximum force of the leg muscles to be exerted on the pedals of the bicycle.

BACKGROUND

Most present cycling designs provide for the driver to exert the force on the pedal by pushing downward with the legs. This is helped somewhat by the driver standing up in the bike, holding onto the handle bars and then using the force of gravity, etc. to exert more force on the pedals. However, such methods are inadequate when compared with the amount of force that can be generated by the legs when a person is in the horizontal sitting position and braces his back against a strong support and uses his legs to exert pressure in the horizontal direction. This position will greatly increase the amount of force that can be generated upon the pedals of the bicycle. Such gain is likely to be in the neighborhood of several hundred pounds of torque.

Conventional bicycle designs provide for cycling motion of the pedals. This results in only a very narrow window in which the user can exert the most power from his legs. In such case, the user's power is very ineffective at the top of the cycle, i.e. with the pedal at the top or at 0° (180° being when the pedal is at the bottom of the cycle). The user's power remains ineffective until the pedal reaches about 30–40° from the top. The best power range for conventional cyclic pedaling is between 40° and 140°. This amounts to 100° of power out of the 180° or so when the legs are actually pushing downward (i.e. from 0° to 180° constitutes the down stroke for purpose of discussion).

The rest of the cycle, the other 180° is when the cycle is returning back up and thus the user is not using the legs in this half of the cycle. After the power part of the stroke is over, the user must then use part of his power to return his foot on the pedal another 180° back to where it will again be in position to exert power on the down stroke.

The applicant's invention by contrast allows for straight line strokes of the pedals and hence the legs can exert the maximum amount of force throughout very nearly the entire length of the power stroke, i.e., on the forward part of the stroke. Hand pedaling arrangements of the type described herein can be use with the horizontal seating arrangement described.

Thus the bicycle drive designs described in the present invention are designed for best use with the driver in a horizontal seating position although different seating arrangements are possible without varying from the spirit of the invention.

SUMMARY

A system for powering bicycles using drive chains that are independently mounted on each pedal arm and connected to a common drive shaft in the rear of the bicycle. Each pedal has a hinge point about the level of the seat and each is freely connected via drive chains to a free wheeling sprocket in the rear. A keyed shaft connects all free wheeling sprockets and provides for each sprocket to drive the keyed shaft in one rotational direction. The pedals can return on the back stroke while driving the free wheeling sprocket in reverse, however this rotation will not affect the main sprocket as the keyed shaft will not connect to the free wheeling sprocket at this point.

The motion of the free wheeling sprockets drive the keyed shaft which supplies motion to a main drive sprocket that is the main powering unit. The main drive is then connected by chain, or the like, to the rear wheel or both wheels, as the case may be, and this drives the bicycle. The hand powering unit operates through a separate free wheeling sprocket and is also arranged like a lever in similar manner to the pedals.

The invention also includes the use of a lowered seating arrangement that can be used with the various shifting arrangements described as well as 2 wheel and 3 wheel applications.

It is an object of the invention to position the driver of the bicycle with the body in a low position so that his legs can exert pedal movements with maximum muscle power.

Another object is to provide bicycle drive designs that can maximize the force that the body can exert on the pedals and wheels of the bicycle.

Another object is to provide bicycle drive designs where the user can exert a continuous and sustained level of power throughout the entire power stroke.

Another object is to provide bicycle drive designs where the travel of the wheel is maximized with the least amount of body motion.

Another object is to provide a supplemental source of manual power for a pedal driven bicycle, namely a hand operable unit capable of powering the bicycle through hand powered pumping of unit.

Another object is to allow for the free travel of pedals and pedal arms on the return from the power stroke.

Other advantages will be seen by those skilled in the art once the invention is shown and described.

BRIEF DESCRIPTION OF THE DRAWINGS

FIGS. 3A–3D show leverage shifting control and linkage layout.

FIG. 5A is a view of a power unit for a roller shifting type.

FIG. 5B is a view of a roller shifting mechanism.

FIG. 7A is a view of a detail of a four way hinge for hand power lever.

FIG. 7B is another view of a four way hinge for hand power lever.

DETAILED DESCRIPTION OF PREFERRED EMBODIMENTS

Figure 1:
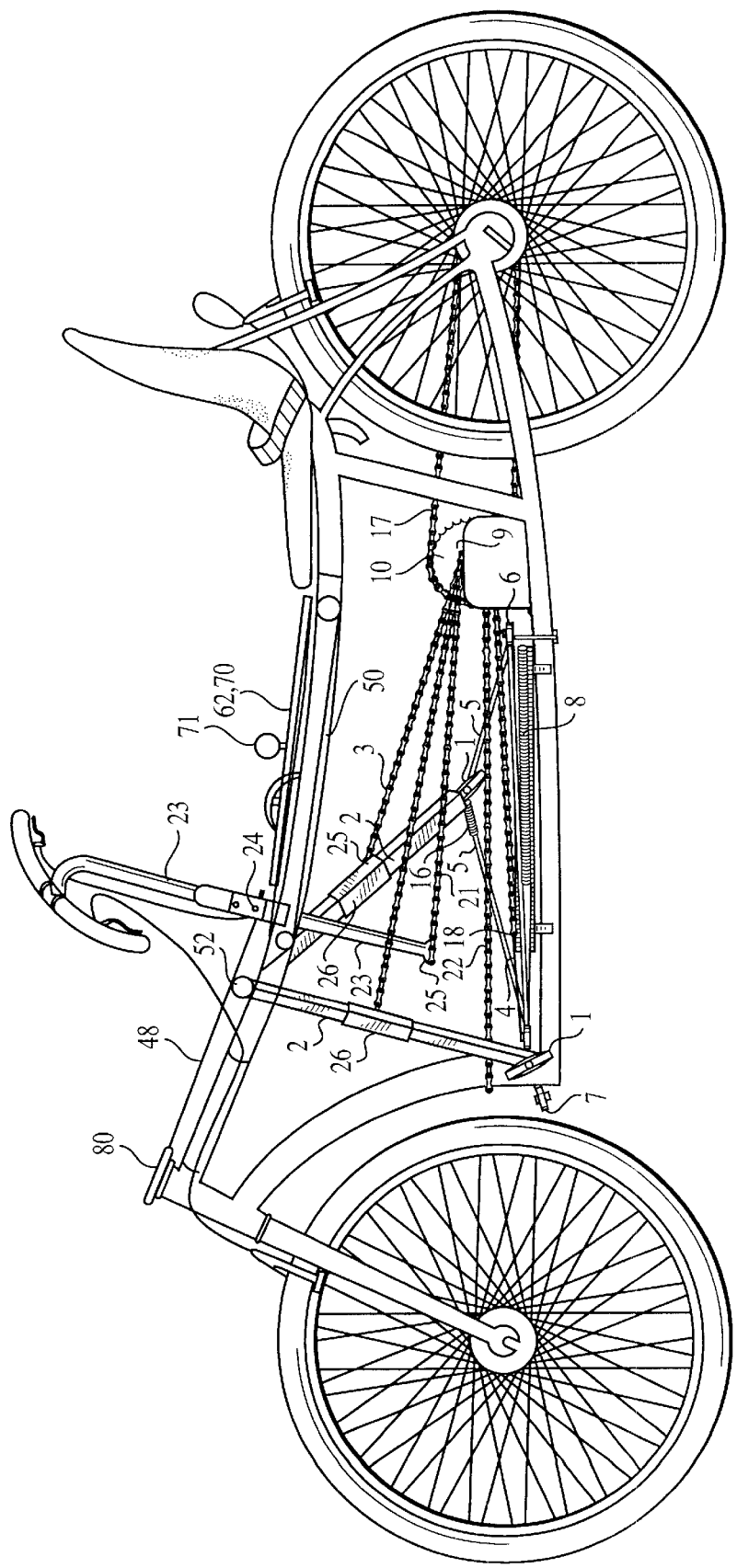
FIG. 1 is a side view of a bicycle frame and drive system with leverage shifting apparatus constructed in accordance with an embodiment of the present invention.
Figure 2:
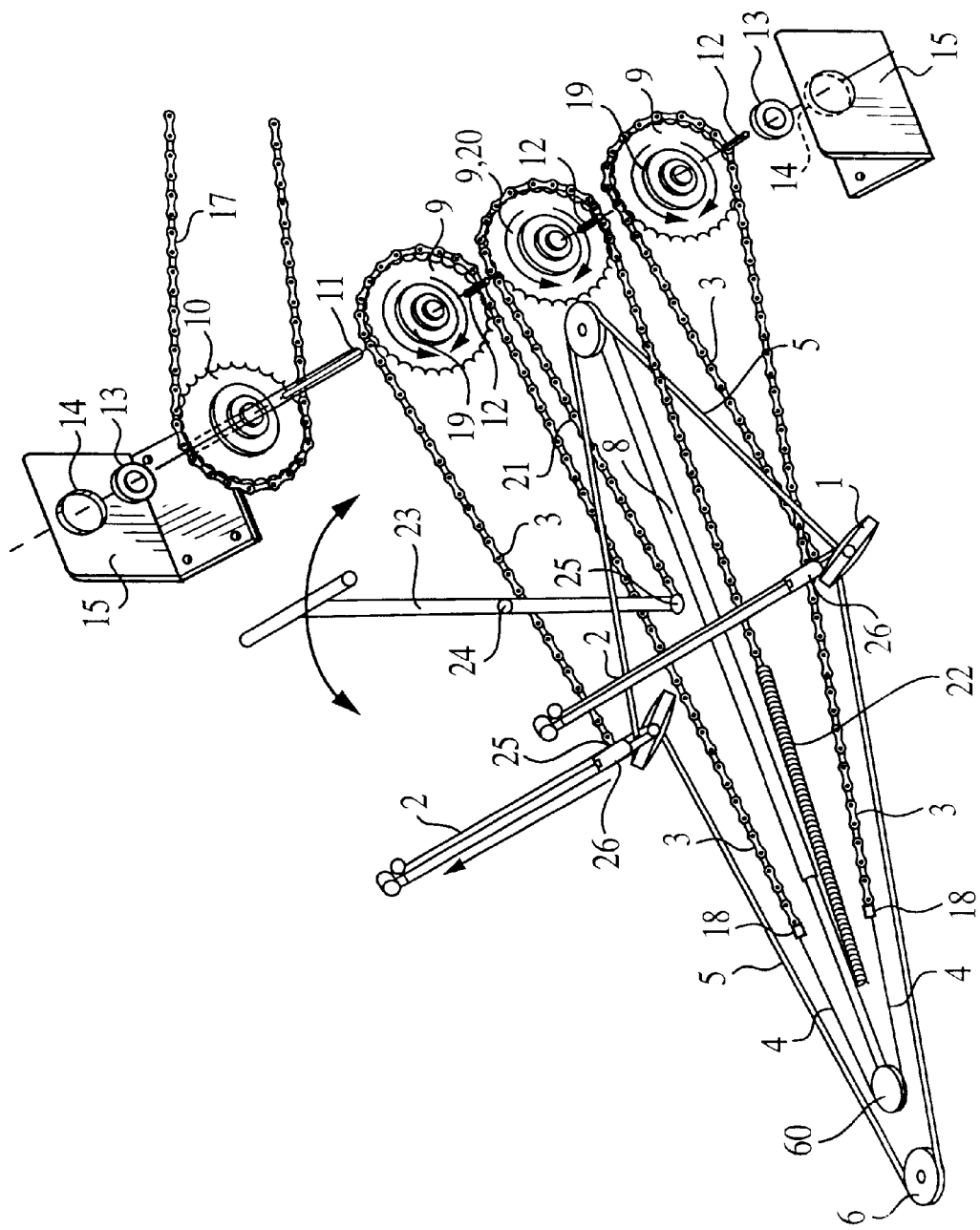
FIG. 2 is a power unit showing hand and foot pedaling and leverage shifting.

An overall drive system of sprockets and chains is best seen in the operational systems depicted in FIGS. 2 and 5. FIGS. 1–2 show the more basic, leverage shifting arrangement, and FIGS. 5A–5B show the drive system for the more advanced roller shifting arrangement. FIGS. 7–8 show the hand powered unit with a leverage and steering shaft 23, hinge assembly 24 and chain connector 25. Details of the hinge assembly 24 are shown in FIGS. 7A and 7B.

Those elements important to both systems are as follows: the pedals 1 act as levers (in contrast to conventional cyclic type pedals) and transfer the motion of the driver's legs onto the pedal arms 2 and then to those drive chains 3 that are in connection with a pair of power collecting or "free wheeling" sprockets 9 (20 is a similar free wheeling sprocket used for a hand powered unit described below). There is one freewheeling sprocket 9 associated with each pedal, thus there are two power collecting sprockets 9 in the power unit for the pedals 1 (there would be three such sprockets if the hand powered unit was constructed as part of the bicycle).

The spring 16 in connection with cable 5 can provide the necessary tension to return pedals 1. Pulleys 7 have a "V" shaped cross-section and are used to direct the cables to fit the shape and size of the vehicle in which they are installed. This arrangement would be the same for both type I and II shifting, to be defined below.

A similar return arrangement is used for the hand unit (23, 24 and 25 in FIGS. 1 and 2). The return spring here is shown as 22 in FIGS. 1 and 2, and is a tension spring. It may be enclosed in a protective casing as shown.

The free wheeling sprockets 9 convert the straight force transmitted by the pedal 1 through the chains 3 to rotational force to rotate a keyed shaft 11 (FIG. 4) when the sprockets 9 are engaged to the keyed shaft (only on the power stroke of the pedal 1, not the return stroke). The main drive sprocket 10 is welded or otherwise fixed to the shaft 11 to then transmit the power force to the driving wheel or wheels (usually this will be the rear wheel or a front wheel in a bicycle but could be two wheels in the case of a tricycle, for example). The main force is transmitted to the rear wheel (FIG. 1) through a chain 17, see FIG. 2. The main drive sprocket 10 is seen in side view in FIG. 4.

Figure 4:
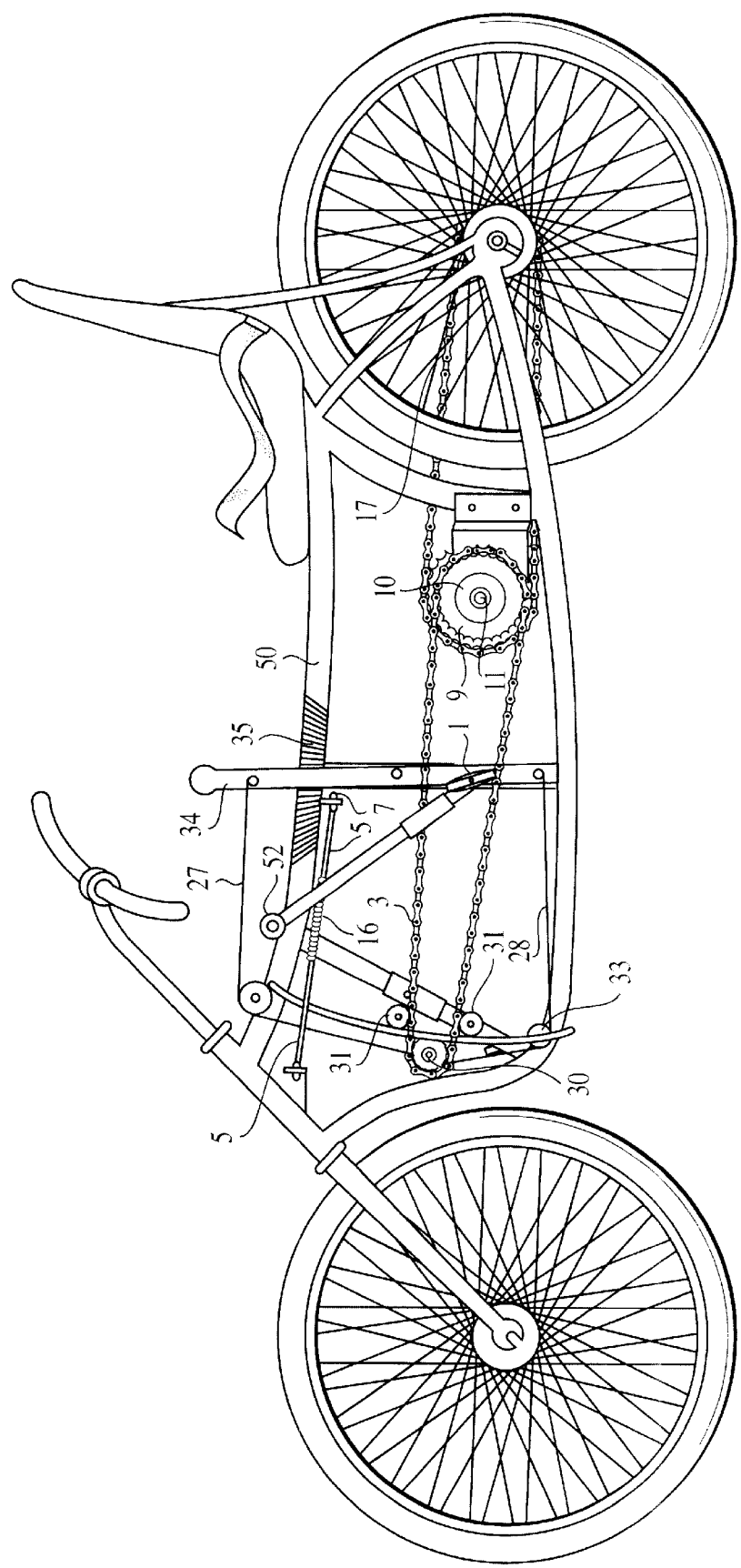
FIG. 4 is a view of bicycle with a roller shifting arrangement.

Note in the embodiment shown in FIG. 4 that that the free wheeling sprocket 9 does the same job as the pawl drive mechanism, which is described herein. The free wheeling sprocket 9 is thus redundant with that mechanism. Therefore the sprocket 9 could be fixed to the rear shaft 11 so long as the pawl drive is used.

The keyed shaft 11 is coupled to the sprockets 9 and/or 20 (free wheeling sprocket for hand unit) through the shaft keys 12 to continue the power force through the sprocket 10 to the chain 17 that is on the drive wheel of the bicycle. The shaft keys lock the shaft 11 and free wheeling sprockets 9 and 20 together.

Free wheeling sprocket 20 is in connection with the hand powering unit (23, 24) and thus is complementary, but not necessary, for the basic power unit of the invention. It is connected to hand unit (23, 24) by chain 21, essentially the same as chains 3. The sprocket 20 is used in connection with the other two free wheeling sprockets 9 to drive the keyed shaft. Sprockets 9 are in connection with the two pedals 1 as shown in FIG. 2.

The keyed shaft 11 should be held by a bearing seat 14 that uses a sealed bearing 13 and a housing plate 15. All of these parts may be of conventional construction as the purpose here is well known in the art. Assembly 41 in FIG. 6 shows a shaft and bearings housing assembly. Brackets 42 are plate brackets to mount the housing 41 to the frame of the bicycle. This part of FIG. 6 would be common to both type I and II shifting arrangements.

The hinge point 52 (FIG. 1) of the pedal arms 2 should be about at the level of the seat (the seat would be roughly in line with top bar 50) and preferably about one inch above the level of the seat. The hinge point 52 of the pedal arm should be chosen so that the mid-point of the length of stroke of the pedal 1 is directly below the hinge point 52 at this point. This will ensure that the movement of the pedal 1 will be generally in a straight line, although an absolutely straight line is not mandatory. Straight line travel will produce a stroke that maximizes the force applied by the legs to the pedals 1 and will keep the force as equal as possible throughout the stroke. This is in keeping with one of the main ideas behind the invention.

Note that the pedal arms 2 are to be hanging straight down from the hinging point 52 when the pedals are directly across from one another (i.e. when the pedals are straight up and down). Both pedal arms are then approximately at a 90 angle to the drive chain 3. This creates a minimal distortion in the position of the drive chain 3 (i.e., a minimal drop in the chain) during the back and forth motion of the pedals 1.

Adjustment of a sliding chain connector sleeve 26 (FIG. 2) can vary the chain length from about two inches to as long as six inches as power and speed requirements are varied by the shifting. A chain length control device 8 (FIG. 2) accommodates the changing chain length as needed.

Leverage shifting allows for a greater range of force-to-travel ratios; i.e., the distance of the stroke length vis-a-vis the travel distance of the sprocket 10. This is the driving idea behind the construction of the pedal and hand powering units.

For instance, when the ratio is set for the highest speed and lowest power a full stroke of the feet will cause the sprocket 10 to turn about 360° of travel or a full revolution. When the power setting is at the highest power ratio, a full stroke will cause the sprocket 10 to turn only about 30° or so. Thus the force-to-travel ratio can vary by a factor of twelve when using such an arrangement. Conventional bikes with multiple gears may only be able to vary this factor by a factor of five or so.

The most basic sort of leverage shifting described herein is referred to as "leverage shifting" (or "type I") and is shown in FIGS. 1–2.

Here, the position of the sliding sleeve 26 upon the pedal arm can be varied from the top of the pedal arm to the bottom of the pedal arm. The control unit 62/70 for this movement is shown in detail in FIG. 3A. FIG. 1 shows the overall placement of the control unit 62/70 at the top of the main tube 50 and in front of the seat.

A shifting control 70 moves along a track 62 (FIG. 3D) and this movement in turn controls the movement of the sliding sleeve 26 along the pedal arms 2. Movement of the single control 70 will move both those sliding sleeves 26 on each pedal arm 2. Chain 3 (shown in FIGS. 3A and 3B) is the drive chain and the effective length of this chain will adjust to the position of the sliding sleeves 26 by the chain length control unit 8 shown in FIG. 3B. FIG. 3B shows an open view of the chain length control unit 8.

The chain length control unit 8 has a housing 140 in which a compression spring 142 and bar 144 are disposed. The bar 144 is connected to the pulley 60 at one end, and is in contact with the compression spring 142 at the other end. The compression spring 142 is fixed at the end opposite to bar 144. Cable 4 is in contact with pulley 60 and with both sections of chain 3, which are connected to the sliding sleeves 26 of both pedal arms. Cable is connected to chain 3 via a conversion coupling 18. In use, as the length of chain 3, and thereby cable 4, is changed, the length control unit takes up or releases the required length of chain 3 by movement of the bar 144 in the direction of arrows 146. This arrangement allows for minimum movement of bar 144 in relation to the length change of chain 3; the bar 144 moves approximately half the distance of the length change of chain 3.

A ball-screw 71 is used to tighten the shift control 70 to the track 62 so that the proper power/speed ratio can be set in place by the user. When the control unit 62/70 is moved back toward the rear of the bicycle, this will raise the sliding sleeve 26 and this will result in a lower speeds and more power in the stroke. When the control unit is moved forward toward the handle bars, this will lower the sliding sleeve 26 and result in higher speeds and lower power on the stroke.

Pedal control cable 5 and associated pulleys 6 are arranged as illustrated in FIG. 2. Cable 5 (FIG. 2) returns each pedal 1 after the power stroke back to position for the next power stroke. This action is created on the first pedal 1 as a return stroke when force is exerted on the second, opposite pedal 1 on the power stroke. That force on the power stroke operates through the cable 5 to return the first pedal 1 back toward the operator's foot and ready for the next power stroke. Note that the front portion of cable 5 and pulley 6 (i.e., that portion of the system closer to the front wheel) is not necessary for this system to operate. The front portion is included to ensure that cable 5 does not disengage from pulley 6 if both pedals 1 are moved simultaneously in one direction.

Other state of the art arrangements can be used in place of sleeve 26 that will provide this sort of connection. The sleeve 26 should be able to travel up and down the pedal arm 2. The sleeve 26 should be set in a position that is appropriate for the amount of power and speed desired by the user. When the sleeve 26 is near the bottom of the pedal 1 and far away from the hinge point 52 (FIGS. 1 and 2), speed will maximized and power will be reduced. When the sleeve 26 is near the top and close to the hinge point 52, this position will maximize power and minimize speed.

The other type of leverage shifting contemplated is referred to as "roller shifting" or "type II" and is shown in FIGS. 4 and 5. Here, the shift lever is in connection with a series of notches 35 in the upper tube 50 of the bicycle frame. The lever 34 is essentially held in place by friction with a spring or other biasing means that holds the lever in position within the spaces created by the notches 35. Manual force can be used to urge the lever 34 out of a notch 35 (by moving the lever somewhat to the side) and the user can then adjust the lever 34 to shift for power or speed.

Referring to FIGS. 5A and 5B, moving the lever 34 forward (in the direction of the handlebars in FIG. 4) will cause shifting unit 40 to be lowered along tracks 38 and 39 and the bicycle will have higher speed and less power. Both tracks are shown in FIG. 5B; a singular track is shown as 38 in FIGS. 4 and 5A. That is, the drive chain 3 will be further away from the hinge point 52 of the pedal arms 2 and hence there will be less leverage on the pedal arms 2. And of course, when the lever 34 is moved backward, in the direction of the rear tire, the bicycle will have higher power and less speed.

Smaller support rollers 31, associated with a main roller 30, are shown in FIGS. 4 and 5A. These are used to hold the chain in better connection with the sprockets or roller 30.

FIG. 5B shows details of the shifting unit as seen looking down, in the same position that a driver of the bicycle would look down. Note that cables 27 and 28 hold shifting unit 40 shown in FIG. 5B in place near the front of the bicycle. These cables connect, respectively, the top and bottom of the shift lever 34 to the shifting unit 40 through the use of pulleys or cable rollers 32 and 33 placed at the top and bottom of the track (see FIG. 4).

The shifting unit 40 itself is on a pair of tracks 38, 39 that holds the unit 40 in place and allows it to move up and down. Pulleys or rollers 36 and 37 (FIG. 5B), on the inside of unit 40, allow the unit 40 to move up and down along the tracks 38, 39 as the pulleys 36, 37 are in connection with the tracks 38, 39. On the outside of the pulleys 36, 37 are sprockets 29 that are connected to each of the pedals 1. There are two sprockets 9, one on each of the drive chains 3 in connection with the pedals 1. Note that there is one drive chain 3 that goes around the sprocket 9 and shifting unit 40 and interacts with the pedal arm 2. There is one drive chain 3 for each pedal arm 2. The cables 27/28, shown as a singular cable in FIG. 5B, are connected to the axle 40a of the shifting unit 40 that holds together the pulleys and the sprockets of the mechanism.

The hinge point 52 of the drive chain 3 on the pedal arms 2 can still be varied by the sliding sleeve 26 (i.e. type I shifting) that is in connection with the pedal arm 2. Chain connector connects the chain 3 to the pedal arm 2 and the unit can be moved up or down upon the pedal arm 2 and then set into place by a set screw or other structure. Note in FIG. 5 the chain connection is replaced by a pawl type connector 54.

In a preferred embodiment, the seating arrangement may be about 23 inches above the level of the ground. The pedal arms may be about 14 inches in length and at the beginning of the stroke the pedals may be about 10 inches below the level of the seat. This will produce pedal strokes that are about 16 inches in length.

Figure 6A:
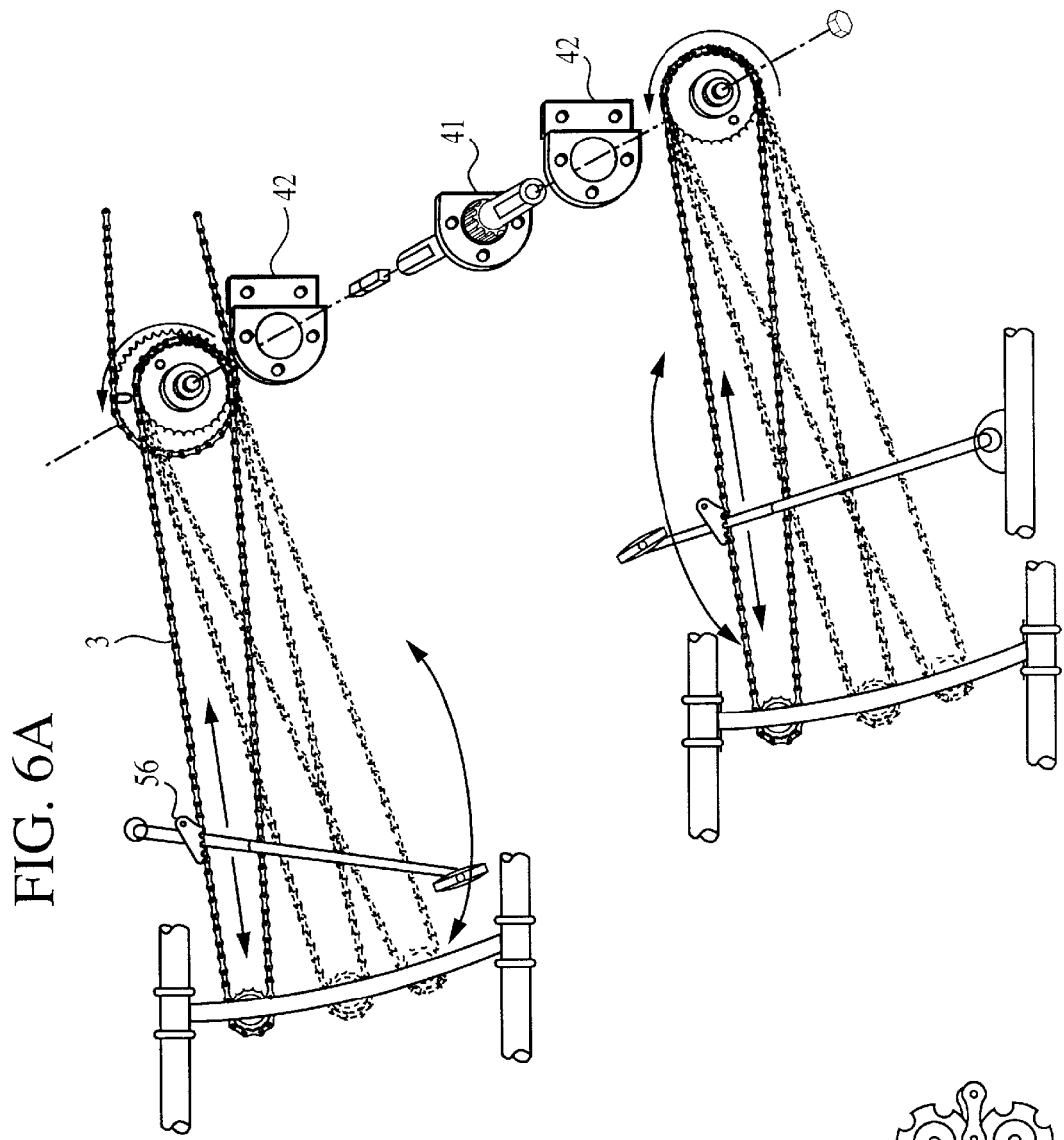
FIG. 6A is a view of power unit; roller shifting type with inverted pedal arrangement.
Figure 6B:
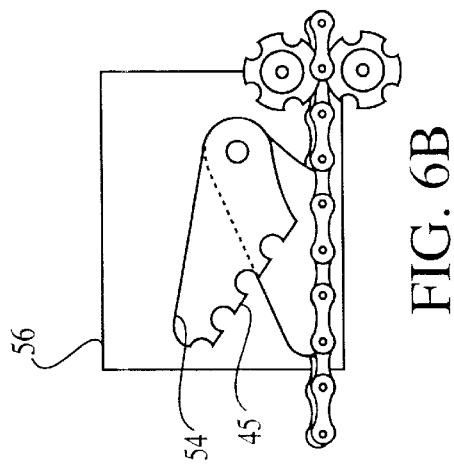
FIG. 6B is a view of a chain pawl mechanism showing locked and unlocked positions of the pawl vis-a-vis the chain.

A chain pawl mechanism is used with type II shifting. The overall system is shown in FIG. 6A and the detail of the pawl and housing is shown in FIG. 6B. The use of the chain pawl 54 allows the force of the pedal stroke in the forward direction to be applied to the drive chain 3 (thus forcing it forward) while on the return stroke, when the pedal is moving backward, it prevents this backward motion from being applied to the chain. Otherwise, if the pedal were fixed to the chain 3 it would cause the chain 3 to move backwards on the return stroke thus defeating the entire purpose and the bicycle wouldn't move anywhere (because the return stroke backward motion would be canceling the motion of the other pedal since the other pedal is moving forward).

In effect, the chain pawl 54 translates the back and forth motion of the pedal 1 into a motion in one direction (forward motion) only of the chain 3 and it does not move the chain 3 at all on the return stroke of the pedal 1. The chain pawl 54 is basically a roughly triangular shaped piece connected to the walls of a housing or box 56 that supports the chain pawl 54 through an axle in the chain pawl that is connected at each end to the walls of the box 56. This allows the chain pawl 54 to move freely upward and downward when it is not in connection with the chain 3, i.e., the pawl 54 can move up/down when it is not engaged to the chain 3 on the forward motion of the pedal stroke.

The box 56 is in turn connected to the pedal sleeves 26 (shown in FIGS. 1 and 5). Thus there is one chain pawl 54 and housing 56 attached to each pedal 1. The drive chain 3 goes through the openings in the front and rear of the pawl box 56 so that the walls of the box 56 keep the chain 3 in close proximity to the pawl 54, and allow it to maintain the pawl and chain connection when the pedal 1 on the forward stroke. Such pawls are often used in the industry, often in the rear drive of geared bicycles.

Protuberances 45 in the bottom edge of the pawl 54 then interlock with spaces in between the links of the chain 3 during the forward motion of the pedals 1. The overall shape of the pawl may be varied so long as it has small protuberances that can interlock with the openings in the chain. On the forward stroke of the pedal 1, the pawl 54 will engage the openings in the chain 3 and translate the forward motion of the pedal 1 onto the chain 3. When that pedal 1 is moving backwards (and hence the housing 56 and pawl 54 inside are also moving backwards), the forward motion of the chain 3 will cause the pawl 54 to spring upwards (see the alternative position of the box 56 in FIG. 6B) and so the pawl will disengage from the chain on this stroke and thus will not interfere with the continued forward travel of the chain. (At this point, the chain is still moving forward due the power stroke on the other pedal.)

The use of the hand pedaling arrangement can be used with both type I and type II models. The use of hand pedaling allows the user to use his arms to power the bicycle and supply additional power to the bicycle in this manner. Such a hand pedaling arrangement does not necessarily have to be used with the embodiments shown herein. The hand pedaling arrangement could be used with many types of drive arrangements so long as they are freewheeling in nature. It is not necessary that the power drive units described here use the hand pedaling invention, these drive units can be used with leg power or in connection with a hand pedaling arrangement alone.

Figure 8A:
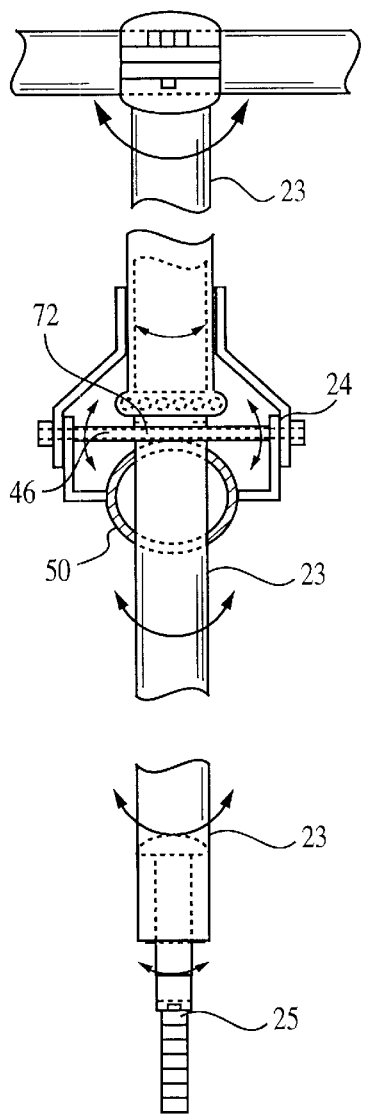
FIG. 8A is a front view of hand power unit.
Figure 8B:
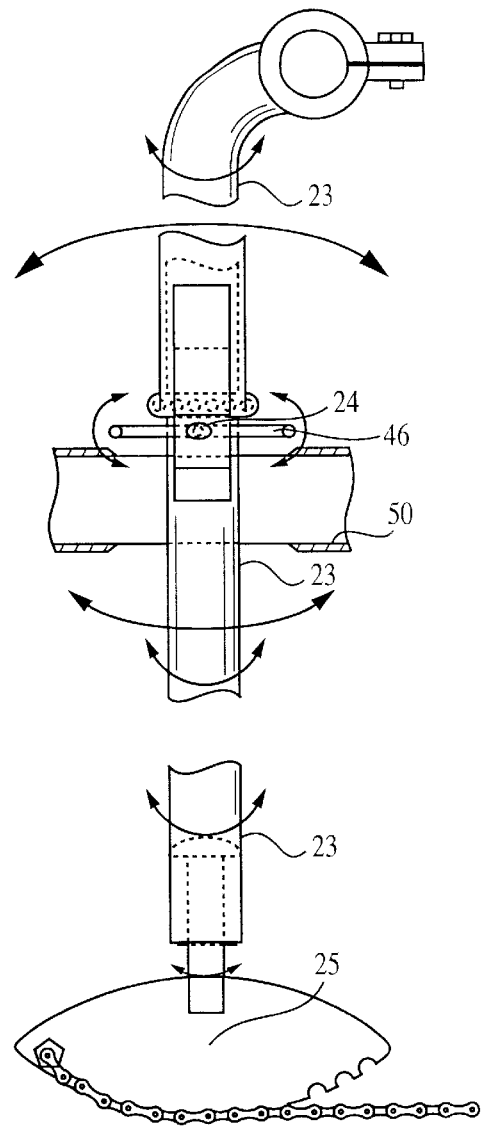
FIG. 8B side view of hand power unit.

FIGS. 8A and 8B show the hand powered unit with a leverage and steering shaft 23, hinge assembly 24 and chain connector 25. Again the drive chain 3 is connected to a free wheeling sprocket 20 just as in the case of the foot pedals 1. And again, the free wheeling sprocket 20 is engaged with the keyed shaft 11. A set screw 19 may be used to secure a hub to the shaft 11. The powering is similar to that used for foot pedals 1. The user rocks the hand unit back and forth and this in turn moves the sprocket 20. Again, the mechanical power generation arrangement here is by way of a lever and not the conventional cyclic-pedaling type of motion. In this case, there is a chain connector 25 that is a section of a sprocket designed to propel the chain 3 forward. The chain connector 25 in connection with the drive chain 21 as can be seen in FIG. 1.

Arrows in FIGS. 7–8 show the motion of the hand pumping in forward and backward direction. Also shown is the connection of connector 25 (same or similar to the chain connections of pedal arm sleeves 26) to chain 21 (see FIG. 1 for the connection) that power the bicycle.

The hand unit would ordinarily be designed to apply force to the keyed shaft 11 in one direction only (preferably the forward direction of motion) and again, on the return stroke the sprocket 20 would be disengaged from the keyed shaft and thus the hand unit can return back without interfering with the rotation of the keyed shaft.

The hand unit also acts as a steering device through the use of the steering belt 48 as seen in FIG. 1, that is in connection with the pulley 46 shown in FIG. 3. The arrows in FIGS. 7 and 8 show the rotation of the shaft 23 as the driver steers the bicycle, and this in turn is transferred to the pulley 46 that in turn moves the belt and this drives the front wheel. The hinge assembly 24 propels the cycle through a universal type pulley and belt assembly. The hinge assembly 24 is jointed on shaft 23 as can be see in FIGS. 7A and 7B.

A pin 72 (FIG. 8A) is a hinge that has two degrees of freedom; front to back and left to right (directions are as the driver would view this). The pin 72 adjusts for the angle of pulley 46 which changes based on hinging of the hinge assembly 24. FIG. 7 shows in detail hinge assembly 24. The pulley 46 has a hole to accommodate shaft 23. Pin 72 is a steel rod that goes through the hole in shaft 23 and gives the assembly a hinging movement in two directions (left-right and forward-back. Pin 72 is welded or otherwise attached to pulley 46.

There is an opening running through the shaft 23 shown in FIGS. 7A and 7B. This opening has a vertical dimension that is taller than the diameter of pin 72. The horizontal dimension of the opening is no wider that the diameter of the pin 72. This results in an upper and lower wall 74 that permits the pin 72 to move upward and downward on the outer diameter of the shaft 23.

This results in the opening shaped as shown in FIG. 7B with flat side walls 77 and a curved upper and lower walls 74. The curved walls match the shape of the shaft 72. The side walls should form a tight fit to the pin 72. The opening in the shaft 23 tapers to a narrow opening in the center of the shaft 23 so that the pin 72 maintains the level of the pulley 46 regardless of the position of the pedaling and steering shaft 23. By this construction, whether the shaft 23 is forward, backwards, or turning, the distance between pulley 46 and pulley 80 (FIG. 1) remains the same.

Both types I and II of shifting (FIGS. 2 and 4) can use the hand powered unit with minor modification. It may also be used with tricycle designs and/or upright designs.

Chain tension can be adjusted with both shifting types described. The chain tensioner or chain adjustment 8 is best seen in FIGS. 1 and 2. This mechanism is an adjustable arrangement that picks up or releases the slack in the chain as the chain is lengthened or shortened. The lengthening or shortening is caused by the speed or power selection and will take place as the leverage shifting system is used since adjustments will cause the effective length of travel of the chain to increase or decrease.

Such adjustment arrangements are state of the art in bicycles and such mechanisms may have several gears inside that move in relation to each other in order to accommodate for slack in the chain. Such mechanism will be needed on any of the units that use the leverage shifting method. Any state of the art mechanisms can be used for this purpose without varying from the spirit of the invention.

In another embodiment of the present invention, the pedal arm and/or the hand power lever arrangements may be utilized for an exercise machine such as an exercise cycle. Instead of supplying rotational power to a rear wheel, the fixed sprocket 10 would be connected to a power dissipating assembly, such a contact-friction or an air-friction type power dissipating assembly which are well known in the art.

Figure 9:
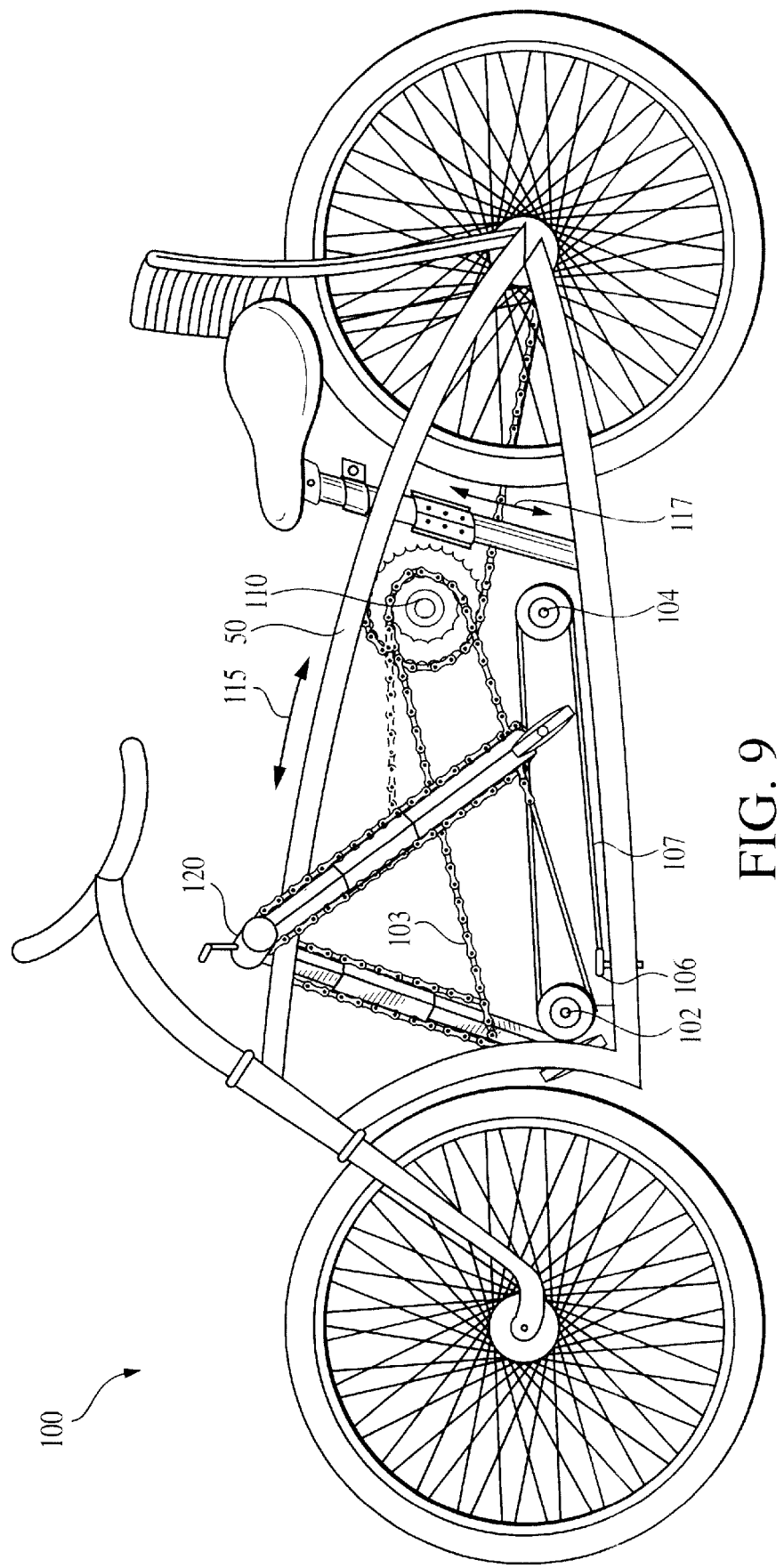
FIG. 9 is a side view of a bicycle frame and drive system with leverage shifting apparatus constructed in accordance with another embodiment of the present invention.

Another embodiment of the present invention is illustrated in FIG. 9. The bicycle 100 has a leverage shifting and control unit 120 and a power drive assembly 110. A unique feature of this embodiment is the slidable shifting and control unit 120 that can move along upper tube 50 in the direction of arrows 115 to accommodate the length of a the user's legs for additional comfort. Sliding the unit 120 toward the front of the bicycle 100 would accommodate a user with longer legs, and sliding the unit 120 toward the rear wheel would accommodate a user with shorter legs. The unit 120 can be attached to the upper tube by a mechanism such as a clamp (not shown) or a split housing 250 (FIG. 10), for example, and can be slid and secured in place by loosening and tightening bolts on the mechanism.

The bicycle 100 also incorporates a slidable drive assembly 110 to accommodate the slidable shifting and control unit 120. The drive assembly 110 is moved to the upper position when the shifting and control unit 120 is in a forward position, as shown in FIG. 9. The drive assembly 110 is lowered when the shifting and control unit is slid back toward the rear of the bicycle 100. Varying the position of the drive assembly 110 with respect to the shifting and control unit 120, in the direction of arrow 117, serves to enhance the power efficiency of the cycle by eliminating slack in the drive chain 103 at the start of the power stroke. The drive chain 103 can move up to the position indicated by the dotted lines in FIG. 9, at which the bicycle 100 would be in a high power setting.

Another feature of the bicycle 100 is the pedal return system comprising a fabric covered rubber cord 107 that is connected to drive chain 103 via a coupling interface (not shown). The rubber cord 107 is routed around a front pulley 102, rear pulley 104, and horizontal pulley 106. The rubber cord 107 functions to return pedals to their starting positions for subsequent power strokes, and also to control the length of drive chain 103 during adjustments of the leverage shifting and control unit, as described above. Incorporating approximately four feet of rubber cord 107 has been found effective while minimizing power loss.

Figure 10:
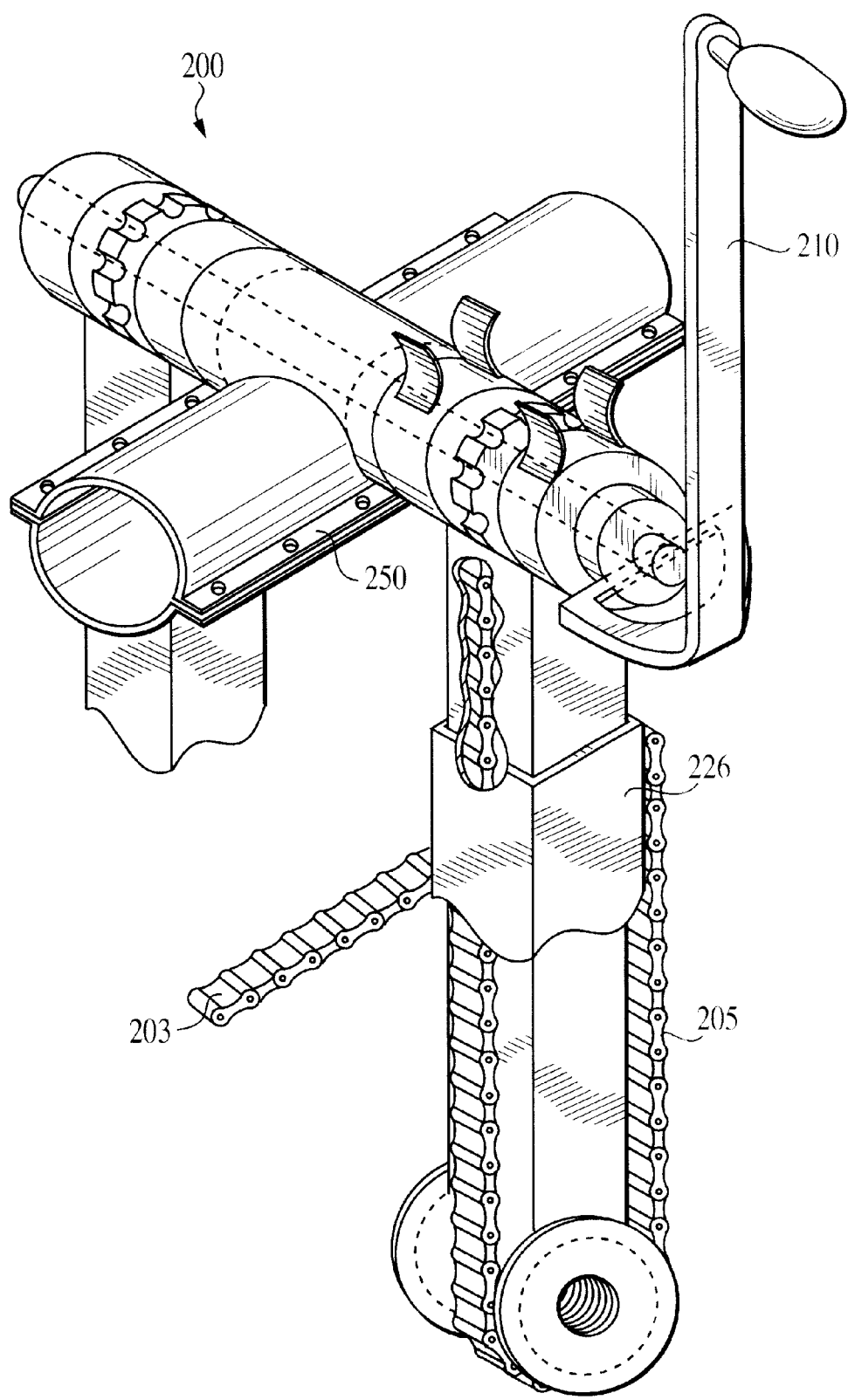
FIG. 10 is a leveraged shifting and control unit in accordance with another embodiment of the present invention.

FIG. 10 shows a different embodiment for a leverage shifting and control unit. The unit 200 has a split housing 250 that can mount to the upper tube 50 for sliding the unit 200 as described above. The unit 200 has sliding sleeves 226 to which drive chains 203 are attached. The unit 200 is adjusted by shifting lever 210 and thereby moving the sleeves 226 by power-shifting chain 205. Other aspects of operation for unit 200 are similar to the shifting and control units described above.

While the foregoing has described in detail preferred embodiments known at the time, it should be readily understood that the invention is not limited to the disclosed embodiments. The invention can be modified to incorporate any number of variations, alterations, substitutions or equivalent arrangements not heretofore described, but which are commensurate with the spirit and scope of the invention. Accordingly, the invention is not limited to the embodiment specifically described but is only limited by the scope of the appended claims.

What is claimed as new and desired to be protected by Letters Patent of the United States is:

1. A vehicle propulsion system for maximizing power output, comprising:
    a first pedal arm and a second pedal arm each having a sleeve and a pedal, said pedal arms being arranged for substantially horizontal motion;
    a power transmission line connected to each of said sleeves at one end and in contact with a transmission system at another end;
    a power output adjustment mechanism arranged to move said sleeves along said pedal arms thereby changing the length of said transmission lines from said sleeves to said transmission system;
    a movable drive assembly comprising a main power unit movable between upper and lower positions in a vertical direction; and
    a pedal return cable system, separate from said power transmission lines, adapted to move a pedal that is not utilized in a power stroke a distance substantially equivalent to a distance that another pedal is moving during a power stroke.

2. The vehicle propulsion system according to claim 1, further comprising a hand power lever having a power transmission line in contact with said transmission system.

3. The vehicle propulsion system according to claim 1, further comprising a length control device for said power transmission line to lengthen or shorten said line in response to system requirements.

4. The vehicle propulsion system according to claim 1, further comprising a system for returning said pedal not utilized in a power stroke to a position to be utilized in a power stroke.

5. The vehicle propulsion system according to claim 1, wherein said transmission system comprises at least two free-wheeling sprockets and at least one fixed sprocket.

6. The vehicle propulsion system according to claim 1, further comprising a user seat having substantial back support.

7. The vehicle propulsion system according to claim 1, wherein said pedal arms are connected to a common hinge such that at a mid-point of travel said pedal arms are directly below said hinge.

8. The vehicle propulsion system according to claim 1, wherein said system is utilized in an exercise machine.

9. A system for supplying power to a cycle comprising:
    at least one pedal arm having a pedal for receiving a force input from a user's foot, said foot pedal arm arranged for substantially horizontal motion;
    a hand power lever having a surface for receiving a force input from hands of said user;
    force transmission lines attached to said at least one foot pedal and said hand power lever on one end and in contact with a transmission system on another end, said force transmission lines having length control devices that function to increase or decrease lengths of said force transmission lines in response to system requirements;
    a power output adjustment mechanism arranged to move sleeves along said at least one pedal arm thereby changing the length of said transmission lines from said sleeves to said transmission system; and
    a movable drive assembly comprising a main power unit movable between upper and lower positions in a vertical direction.

10. The system according to claim 9, wherein said system is utilized in an exercise machine.

11. The system according to claim 9, further comprising a system for returning said pedal not utilized in a power stroke to a position to be utilized in a power stroke.

12. The system according to claim 9, further comprising a power transmission system having at least two freewheeling sprockets and at least one fixed sprocket.

13. The system according to claim 9, further comprising a user seat having substantial back support.

14. The system according to claim 9, comprising two pedal arms connected to a common hinge such that at a mid-point of travel said pedal arms are directly below said hinge.

15. A drive assembly comprising:
- a first pedal arm and a second pedal arm each having a sleeve and a pedal, said pedal arms being arranged for substantially horizontal motion;
- a power transmission line connected to each of said sleeves at one end and in contact with a transmission system at another end;
- a power output adjustment mechanism;
- a pedal return cable system, separate from said power transmission lines, adapted to move a pedal that is not utilized in a power stroke a distance substantially equivalent to a distance that another pedal is moved during a power stroke; and
- a movable drive assembly comprising a main power unit movable between upper and lower positions in a vertical direction.

16. The drive assembly of claim 15, wherein said power output adjustment mechanism is arranged to move said sleeves along said pedal arms thereby changing the length of said transmission lines from said sleeves to said transmission system.

17. The drive assembly according to claim 15, wherein said transmission system comprises at least two freewheeling sprockets and at least one fixed sprocket.

18. The drive assembly according to claim 15, further comprising a hand power lever having a power transmission line in contact with said transmission system.

19. The drive assembly according to claim 15, further comprising a length control device for said power transmission line to lengthen or shorten said line in response to system requirements.

20. The drive assembly according to claim 15, further comprising a user seat having substantial back support.

21. The drive assembly according to claim 15, wherein said pedal arms are connected to a common hinge such that at a mid-point of travel said pedal arms are directly below said hinge.

22. The drive assembly according to claim 15, wherein said assembly is utilized in an exercise machine.

23. A drive assembly comprising:
- a seat to accommodate a user;
- a first pedal arm and a second pedal arm each having a sleeve and a pedal, said pedal arms being arranged for substantially horizontal motion, wherein said pedal arms are slidable to control the distance between said pedal arms and said seat;
- a power transmission line connected to each of said sleeves at one end and in contact with a transmission system mounted to a frame member at another end, wherein said transmission system is moveable along said frame member;
- a power output adjustment mechanism;
- a movable drive assembly comprising a main power unit movable between upper and lower positions in a vertical direction; and
- a pedal return cable system, separate from said power transmission line, adapted to move a pedal that is not utilized in a power stroke a distance substantially equivalent to a distance that another pedal is moved during a power stroke.

* * * * *